March 24, 1942.    W. HEIMANN    2,277,101
CATHODE RAY SCANNING DEVICE
Filed March 31, 1939
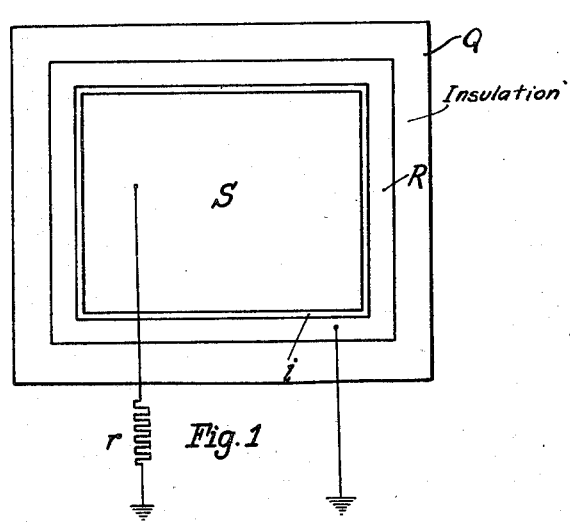
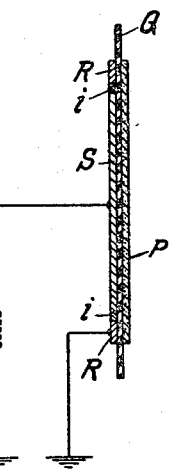
Inventor:
Walter Heimann
by E. D. Kinney
Att'y

UNITED STATES PATENT OFFICE 2,277,101

CATHODE RAY SCANNING DEVICE

Walter Heimann, Berlin, Germany, assignor to C. Lorenz Aktiengesellschaft, Berlin-Tempelhof, Germany, a company Application March 31, 1939, Serial No. 265,326
In Germany March 30, 1938

4 Claims. (Cl. 178—7.2)

In the operation of cathode ray scanning devices it has been found that disturbing impulses are superimposed upon the useful picture impulses. Such disturbing impulses are due to various causes. Oscillographic records have shown that after each line or picture scanning an impulse occurs which is particularly strong and acts in opposition to the useful picture impulse. This counteracting impulse causes the edge portions of the picture to be greatly darkened. It is therefore desirable to provide for weakening this impulse or for obviating it.

In accordance with the invention the mosaic screen is fitted with an arrangement that shall enable the useful picture signals to be separated from disturbing signals.

One embodiment of the invention is shown in the accompanying drawing, in which

Fig. 1 is a diagrammatic end view of a mosaic screen as provided by the invention, Fig. 2 is a partially sectioned side view thereof.

The mosaic screen comprises a metal plate S, which is the so-called signal plate, a layer P composed in well known manner of metal particles and an insulating material in which these are embedded, and an insulating layer Q between S and P. Layer P is generally designated as photoelectric or mosaic layer.

The signal plate S is surrounded with a frame R constituted by an electrically conductive layer which is thus arranged on the same side of the layer Q as the plate S. Plate S is insulated from the frame R by a strip $i$. The outer edge of the frame R coincides with that of layer P, that is, with the edge of the surface available for the scanning operation. In order that the useful picture surface be not much decreased in this way the frame R should not be broader than is necessary. The width thereof may be ascertained experimentally.

In order to separate the useful picture signals and the disturbing signals from each other frame R is directly connected to earth while plate S is grounded through a resistance $r$. The picture voltages arising at $r$ are conveyed to an amplifier not represented in the drawing.

Instead of the frame R here shown by way of example, metal strips may be arranged on two sides of the plate S. Also, separate metal strips may be provided on all the sides thereof. Such two or more strips are then earthed conjointly. In the case of such subdivided frame a modification of the invention would be to ground the frame in part only, thus providing for parts thereof not grounded.

What is claimed is:

1. A cathode ray scanning device comprising an insulating member, a mosaic screen comprising a layer of photoelectric material mounted on one surface of said member, a conductive signal plate mounted on the opposite surface of said member, a conductive, frame-shaped, layer encircling said signal plate and insulated therefrom mounted on said opposite surface of said member, said signal plate and at least a portion of said frame-shaped layer being directly behind, in capacitative relation with and in close proximity to said screen, and means for grounding said layer.

2. A device according to claim 1, wherein the frame-shaped layer is a closed structure.

3. A device according to claim 1, wherein the frame-shaped layer is a discontinuous structure whose parts are earthed conjointly.

4. A device according to claim 1, wherein the frame-shaped layer is a discontinuous structure a part only of which is grounded.

WALTER HEIMANN.